United States Patent
Lohmann

[15] 3,637,293
[45] Jan. 25, 1972

[54] KINOFORM MATCHED FILTER METHOD

[72] Inventor: Adolf W. Lohmann, La Jolla, Calif.
[73] Assignee: International Business Machines Corporation, Armonk, N.Y.
[22] Filed: Nov. 26, 1969
[21] Appl. No.: 880,258

[52] U.S. Cl..........................350/162 SF, 235/181
[51] Int. Cl.............................G06g 9/00, G02b 27/38
[58] Field of Search................350/3.5, 162 SF; 178/6.8; 235/181; 340/15.5

[56] References Cited

OTHER PUBLICATIONS

Lohmann, Applied Optics, Vol. 7 No. 3, March 1968 pp. 561–563
Lesem et al., IBM Jour. of Research & Development, Vol. 13, No. 2, March, 1969, pp. 150–155

*Primary Examiner*—David Schonberg
*Assistant Examiner*—Ronald J. Stern
*Attorney*—Hanifin and Jancin and John L. Jackson

[57] ABSTRACT

A method of optical filtering in which a phase object is constructed in accordance with the desired matched filter operator and during the filtering operation incoherent light is used. This type of incoherent filtering method is applicable to any filter operator having only nonnegative portions.

5 Claims, 4 Drawing Figures

PATENTED JAN 25 1972  3,637,293

INVENTORS

ADOLF W. LOHMANN

BY John K. Jackson
ATTORNEY

KINOFORM MATCHED FILTER METHOD

CROSS-REFERENCES TO RELATED APPLICATIONS

"The Kinoform: Method of Manufacturing Wave Shaping Devices," invented by P. M. Hirsch, J. A. Jordan, Jr., and L. B. Lesem, filed Nov. 25, 1968, Ser. No. 778,585, and assigned to the assignee of this application.

"Discrete Aperture Method of Making Synthetic Kinoforms and Holograms," invented by P. M. Hirsch, J. A. Jordan, Jr., and L. B. Lesem, filed Jan. 29, 1969, Ser. No. 794,977, and assigned to the assignee of this application.

"A Method for Figuring Lenses," invented by P. M. Hirsch, J. A. Jordan, Jr., and L. B. Lesem, filed Apr. 4, 1969, Ser. No. 813,651, (now abandoned) and assigned to the assignee of this application.

"Computer Generated Filtering Method," invented by P. M. Hirsch, J. A. Jordan, Jr., and L. B. Lesem, filed Nov. 26, 1969 Ser. No. 880,260 assigned to the assignee of this application.

BACKGROUND OF THE INVENTION

1. Field of the Invention

This invention relates to optical information processing and filtering in general, and more particularly, to computer-generated optical filters for use in an incoherent filtering system.

2. Description of the Prior Art

Optical information processing is a relatively new science of image processing using stops and diffraction patterns. Many mathematical procedures such as multiplication, correlation, etc., are possible using holographic diffraction patterns in a coherent optical system. Correlation can also be achieved in incoherent systems. These operations, together with others such as inverse filtering can be accomplished using computer-generated or synthetic holographic filters in the coherent optical system. One holographic filtering system is described in Applied Optics, Vol. 7, No. 3, Mar. 1968 at page 561.

An excellent text treatment is also presented in "Introduction to Fourier Optics," McGraw-Hill, by Joseph W. Goodman, Chapter 7—Spatial Filtering and Optical Information Processing.

The usual holographic optical filtering practice makes use of a laser as a coherent light source, several complicated optical elements, the holographic diffraction pattern, and a detection scheme. Inherent in holographic diffraction patterns are two or more diffraction orders. These may be separated angularly in a two-beam hologram. If they are not separated, the desired diffraction order is obscured by the undesired orders. If they are separated, the desired order is diffracted away from the optical axis of the laser at the expense of bandwidth. Several problems attend the use of conventional optical information processing systems. These include inefficient utilization of the available light which results from the fact that very little of the light from the object to be filtered is diffracted by the hologram into the desired order. Also, the requirement that orders be separated limits the size of the image, which in turn limits the size and/or resolution of the object to be filtered. Additionally, such systems are usually costly and complex and due to the extreme rigidity requirements of coherent imaging systems, require an optical bench. It is also well known that noise problems are also present in any coherent system. Noise may arise from dust and speckling or diffraction.

Finally, the applications available to coherent filtering systems are severely limited in that due to the requirement of coherent illumination "real-time" processing is virtually impossible. That is, if coherent systems are used, the image must be illuminated coherently. Data, which might be in electronic form, for example, must be converted and displayed in such a way that a photographic transparency can be made and this transparency illuminated. This step precludes real-time data processing.

Almost all of the problems associated with coherent, holographic optical processing systems can be eliminated if kinoforms are used. If kinoforms are used in incoherent systems, matched filtering or correlation may be accomplished.

The kinoform process is described in U.S. Pat. application Ser. No. 778,525, entitled "The Kinoform: Method of Manufacturing Wave Shaping Devices," by L. B. Lesem, P. M. Hirsch, and J. A. Jordan, Jr. and assigned to the same assignee as the present application. In addition, the kinoform process was described in a paper presented to the Optical Society of America Meeting on Mar. 13, 1969 and this paper is published in Vol. 13, No. 2 of the IBM Journal of Research and Development, page 150 et seq.

The kinoform is a wave front reconstruction device which, like the hologram, provides the display of a three-dimensional image. In contrast to the hologram, however, the illuminated kinoform yields a single diffraction order and ideally, all the incident light is used to reconstruct the one image. All the spatial frequency content or bandwidth of the device is available for the single image.

A kinoform operates only on the phase of an incident wave front, being based on the assumption that only the phase information in a scattered wave front is required for the construction of an image of the scattering object. The amplitude of the wave front in the kinoform plane is assumed constant as is approximately true for any diffusely scattering object in the far field. The kinoform may therefore be thought of as a complex lens which transforms the known wave front incident upon it into the wave front required to form the desired image. Although it was first conceived as an optical focusing element, the kinoform can be used to transform the wave front of any physical waveform; e.g., ultrasound or microwaves.

SUMMARY OF THE INVENTION

Briefly, a matched filtering operator to be implemented is mathematically defined. The filter may, for instance, be that which has as its impulse response function the intensity distribution of an object to be "matched."

In the present invention in the preferred embodiment, the matrix of nonnegative values representing the filter is processed, and the phase required for a kinoformic representation of this matrix calculated and plotted. The plot is then photoreduced and bleached to provide the kinoform filter. The phase calculation, plotting and bleaching are as described in the aforementioned patent application, Ser. No. 778,525.

During actual filtering the object to be filtered such as a transparency having letters thereon is illuminated with incoherent light which preferably is color filtered and diffused. The light scattered by the object then passes through the filter and the resultant filtered image, imaged by means of a lens.

Other alternate embodiments including one in which the incoherently illuminated object to be filtered is scanned through the filter and displayed on a cathode-ray tube such that real-time processing is accomplished, are also provided.

DETAILED DESCRIPTION OF THE DRAWINGS

Figure 1:
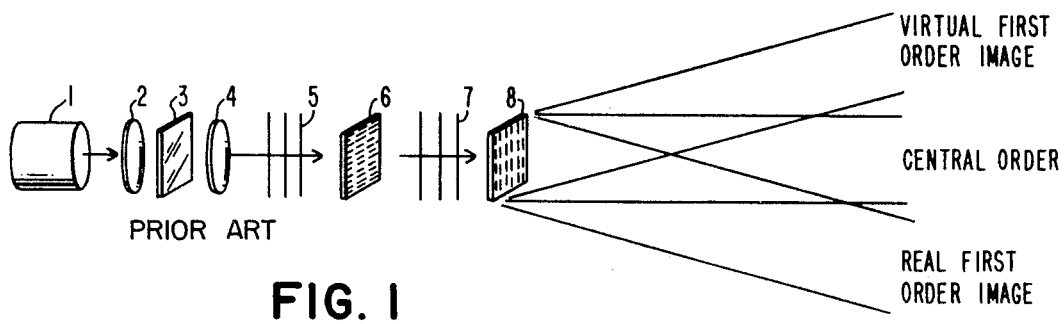
FIG. 1 is an illustration of a typical holographic coherent information processing system.

To aid in an appreciation and understanding of the subject novel technique, refer first to FIG. 1, where there is an illustration of a coherent optical processing system, using holographic members. While this system is described in detail in the aforementioned Applied Optics reference and Goodman text, a brief description will be given to aid in an appreciation of the present incoherent filtering system. In FIG. 1, a light source 1 such as a laser provides a coherent, monochromatic wave front which is shaped into a plane or spherical wave front 5 by an objective lens 2, spatial filter 3 and collimating lens 4. The wave front 5 illuminates the object 6 which contains data which is to be filtered; i.e., a convolutional operation is to be carried out on the one-, two-, or three-dimensional data. As illustrated in FIG. 1, the data is carried on a transparency such that a coherent wave front is scattered from it. The wave front 7 illuminates the holographic member 8. Most of the light is transmitted in the central diffraction order, while relatively little is transmitted in the first order. The desired filtered image appears in the real first order.

As briefly discussed above, this type of filtering or processing system has many attendant disadvantages such as high cost and complexity. Additionally, for many applications it is made impractical by its requirements, due to the use of coherent light, of very accurate alignment and extreme stability which necessitate an optical bench and a skilled craftsman. Also, the requirement that orders be separated limits the size of the image, which in turn limits the size and/or resolution of the object (data) to be filtered. Finally, not only is there an inefficient use of light in that most of the incident light is diffracted into the central order, but additionally, real-time processing is precluded due to the requirement that the data to be filtered must be reduced to photographic form such that it can be caused to transmit coherent illumination.

Several attempts have been made in the past to make holographic filtering more practical. Since all of the above listed problems arise from the use of coherent light, attempts have been made to construct incoherent systems. These systems have approximated coherent light by viewing only a small area and have been unsatisfactory due to poor quality.

Figure 2:
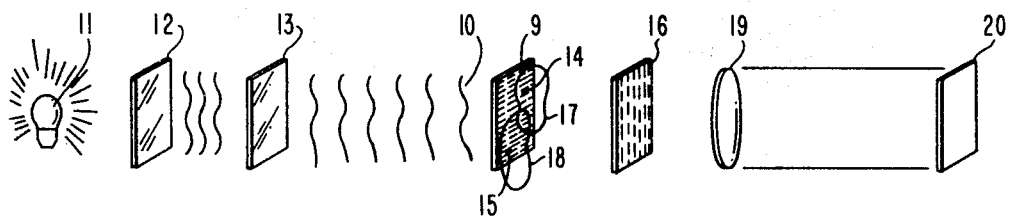
FIG. 2 is an illustration of one embodiment of the subject novel incoherent kinoform information processing system.
Figure 3:
FIG. 3 is a photograph of an unfiltered letter B.
Figure 4:
FIG. 4 is a photograph of the correlation between the unfiltered letter B shown in FIG. 3 and a kinoform matched filter for the letter B.

Most of the above problems are overcome by the novel kinoform filtering technique which is the subject of this patent application. In FIG. 2 is illustrated the kinoformic incoherent filtering system. As illustrated, the transparency 9 containing the data to be filtered is illuminated by quasi-monochromatic, temporally incoherent waves 10. The waves 10 emanate from, for instance, an incandescent light 11 and prior to their arrival at the object 9 are color filtered by filter 12, such that only waves of the spectrum for which the kinoform filter 16 was designed are passed. The waves are also passed through a diffuser 13.

The object 9 can be thought of being made up of many point sources, with each point source of a specified intensity and with a phase varying with time, i.e., temporally incoherent. The points 14 and 15 represent two such point sources. Each point source 14, 15 illuminates the kinoform 16 which in turn produces a virtual image 17, 18 positioned as shown relative to the position of the point source and whose intensity is proportional to the intensity of the point source. Stated mathematically, if $F(a,b,z)$ is the intensity of the point at $(a,b,z)$ of the virtual image from the kinoform produced by a point source of unit intensity at the point (0,0,0), then a distribution of sources with intensity $|\theta(x,y,z)|^2$ will produce a virtual image whose intensity is $|\theta(x,y,z)|^2 F(a+x, b+y,z)$ at the point $(a,b,z)$. Since energy (intensities) are accumulative in incoherent light, the total intensity at point $(a,b,z)$ is given by the equation $$\sum_z \sum_x \sum_y |\theta(x,y,z)|^2 F(a+x, b+y,z)$$

If a lens 19 is used to image this virtual pattern onto a screen or other image recording device 20, then the pattern becomes $$\sum_z \sum_x \sum_y |\theta(x,y,z)|^2 F(x-a, y-b,z)$$

These two cases can be thought of as correlation or convolutional filtered objects. This system has numerous advantages such as it is relatively low in cost and is not complex in that it has neither the extreme alignment nor imaging requirements of a coherent system. Additionally, there is no noise problem from microscopic dust particles or flaws in the optics since these are averaged out in an incoherent system. Furthermore, real-time processing can be accomplished since it is possible to use real-time data. That is, the data to be processed can be displayed on a cathode-ray tube and the light from the CRT phosphor used as the illumination. Also, since it is a single order system there is no overlapping order problem which limits the size of the object to be filtered and therefore very large objects can be filtered using very small filters.

It should be understood in connection with FIG. 2 that the term incoherent light is used in its true sense. That is, while as illustrated in this figure, for purposes of quality, a diffuser and color filter are used along with a "separate" source of incoherent light, these members are not required. The ordinary ambient light reflected from a piece of paper having the data to be filtered printed on it is sufficient. In this type of simple setup the data is viewed through the kinoform filter and the eye constitutes the lens or assuming that the ambient light is great enough, the filtered image is scanned through the filter.

Further with respect to color filtering, while in good quality systems this is desirable, it is not necessary. That is, the kinoform filters which have actually been constructed have been "tuned" for use with red light. These filters have been satisfactorily used in systems where the only light is reflected light from normal fluorescent lights and with illumination from a black-white CRT display.

In summary and to tie in the aforereferenced Kinoform technique which is described in patent application Ser. No. 778,525, a discussion of the calculation and construction of a filter will be provided.

During calculation of the filter, the impulse response function is considered to be a three-dimensional array of point apertures. Each aperture is assigned a value between zero and one, where zero implies that no light is transmitted through the aperture, one implies an open aperture, and the values between represent the relative transmittance of the apertures. These values are made to correspond to the square root of $F(x,y,z)$. These values are read into a calculating machine, using for example punched cards, and a plot tape is generated.

The first step in generating the plot tape is to discretize the impulse response function into a vector of $m$ elements to multiply each element $\sqrt{F_j}$ of the $\sqrt{F}$ array by a phase factor $e^{i\phi j}$ from a random or selected distribution. Then letting $T(x_j) = \sqrt{F_j} e^{i\phi j}$, the next step is to use the discrete form of the Kirchhoff diffraction formula to calculate the wave front at the kinoform filter position required to reproduce the impulse response function $F$. In the Fresnel approximation, this is accomplished by calculating $$TE(l/p) = \sum_{j=-m/2}^{m/2-1} T(x_j) e^{iK(\Delta x)2j2} e^{2\pi(1/p)j/m}$$

In the calculations, zeros are appended to the $f$ array so that it is a vector of $n$ elements. This interpolates the TE (transform) array:

$$TE(l/p) = \sum_{j=-n/2}^{n/2-1} T(x_j) e^{iK(\Delta x)2j2} e^{2\pi i l j/n}$$

where $n=pm$, and $T(X_j)=0$ for $-n/2 \leq j < m/2$ and for $m/2 \leq j \leq n/2-1$. $l$ has the range from $-n/2$ to $(n/2-1)$.

Since the TE array is of period $n$, it may be repeated as many times as necessary, to provide a filter as large as desired. The TE array has the form of $TE_{l/p}=A(l/p) e^{\omega_{l/p}}$. In the generation of the kinoform filter, only the phase $\omega_{l/p}$ is used; the amplitude $A(l/p)$ is assumed to be constant.

The introduction of the phase factor $\exp[i\phi(a,b)]$, which simulates the ground glass or the point aperture format alleviates the need for considering amplitude in the calculation.

The phase $\omega_{l/p}$ is plotted on a plotter with, for instance, 32 gray levels, such that for a single wavelength the phase ranges from 0 to $2\pi$ over the scale. For two or three wavelengths the 32 gray levels would be spread over 0 to $4\pi$ or 0 to $6\pi$, respectively. This alternate approach is advantageous in that fewer edges occur in the resultant kinoform causing less scattered light. The essential point is that the wave retardation at an edge of the profile must be a multiple integer of a wavelength. The plot is then photoreduced to the appropriate size, governed by the wavelength of light used, and the design distance from the data to be filtered to the filter. The photoreduced device is then etched, for example, with Kodak etch bath EB-3. The etch bath etches the surface of the photoreduction in proportion to the darkening of the photographic reduction. The etching of the photoreduction for a kinoform filter must be performed with much more care than is required for conventional bleached holograms. The relief of the emulsion must be such that light incident upon a region of $\phi=0$ will be retarded by one wavelength, compared with the light incident upon a region of $\phi=2\pi$. When phase matching is achieved, almost all of the light incident upon the kinoform filter will be present in the desired impulse response function with no spurious orders.

While the subject invention has been described systemswise with the filter being photographically produced, due to the noncriticality of the required light, both the filter and the data could be real-time displayed. This could be accomplished with two deformographic storage display tubes, one for displaying the object to be filtered and a second to display the desired kinoform. The displays could come from a vidicon or a computer to allow real-time filtering.

Additionally, it will be obvious to those skilled in the art that the subject invention is equally applicable to other than the optical-type applications herein described. Thus, for instance, sonic and ultrasonic filters could be readily implemented. In this event, however, as will be obvious the filter, while being calculated in exactly the same manner as herein described, would be made of different materials, depending on the application. Therefore, other techniques such as cutting and milling, rather than bleaching would be employed.

While the invention has been particularly shown and described with reference to several embodiments, it will be understood by those skilled in the art that various changes in form and detail may be made without department from the spirit and scope of the invention.

What is claimed is:

1. A method of performing the mathematic convolution between a three-dimensional convolutional operator with only positive values and a three-dimensional function by processing physical incoherent waves emanating from a physical amplitude distribution with a processing member to produce a zero diffraction order output at an output plane comprising the steps of:
   A. representing said function by a real physical object which when illuminated by a wave front scatters said wave front according to said amplitude distribution to provide said physical incoherent waves;
   B. discretizing said convolutional operator across a three-dimensional matrix to obtain a matrix of positive values;
   C. constructing said processing member according to the processes for making a kinoform wherein said discretized convolutional operator is considered to be the intensity of the image projected by said kinoform; and
   D. illuminating said processing member with said physical incoherent waves to selectively retard said waves with resultant interference at said output plane in the zero diffraction order corresponding to said convolution.

2. The method of claim 1 wherein said physical incoherent waves are incoherent light waves such that optical interference occurs at said output plane.

3. The method of claim 2 wherein said processing member is made of a material of substantially uniform transmissivity but with selectively varied thickness corresponding to said controlled phase-retarding areas.

4. The method of claim 3 wherein said selectively varied thickness is obtained by calculating the phase distribution required to produce said operator in optical form at said output plane with the assumption that said physical incoherent light waves are from a point source, plotting said calculated phase distribution as amplitude on a multigrey level plotter, photoreducing said plot and bleaching said photoreduction.

5. The method of claim 4 wherein said physical incoherent light waves are provided by a cathode-ray tube having displayed thereon said data to be processed.

* * * * *